United States Patent [19]

Graham

[11] Patent Number: 4,475,235

[45] Date of Patent: Oct. 2, 1984

[54] SIGNATURE VERIFICATION SENSOR

[75] Inventor: Martin Graham, Berkeley, Calif.

[73] Assignee: Rolm Corporation, Santa Clara, Calif.

[21] Appl. No.: 336,946

[22] Filed: Jan. 4, 1982

[51] Int. Cl.³ .............................................. G06K 9/22
[52] U.S. Cl. ......................................... 382/3; 178/18;
340/365 C; 382/59
[58] Field of Search ................... 382/3, 4, 59; 178/18,
178/19; 340/365 R, 365 C, 365 A, 365 E

[56] References Cited

U.S. PATENT DOCUMENTS

| | | | |
|---|---|---|---|
| 3,579,186 | 5/1971 | Johnson et al. | 382/3 |
| 3,618,019 | 11/1971 | Nemirovsky et al. | 382/3 |
| 3,668,313 | 6/1972 | Dym | 178/19 |
| 3,699,517 | 10/1972 | Dyche | 382/3 |
| 3,956,734 | 5/1976 | Radcliffe | 382/3 |
| 3,983,535 | 9/1976 | Herbst et al. | 382/3 |
| 4,035,769 | 7/1977 | Sternberg et al. | 382/3 |
| 4,126,760 | 11/1978 | Gordon | 178/18 |
| 4,143,357 | 3/1979 | Baver et al. | 382/3 |
| 4,281,313 | 7/1981 | Boldridge | 382/3 |
| 4,389,711 | 6/1983 | Hotta et al. | 178/18 |
| 4,394,773 | 7/1983 | Ruell | 382/4 |

OTHER PUBLICATIONS

Lew "Optimal Accelerometer Layouts for Data Recovery in Signature Verification", *IBM J. Res. Develop.*, vol. 24, No. 4, Jul., 1980, pp. 496–511.

Primary Examiner—Leo H. Boudreau
Attorney, Agent, or Firm—Blakely, Sokoloff, Taylor & Zafman

[57] ABSTRACT

A sensor having a particular application in the field of signature verification is disclosed. In the presently preferred embodiment, two plates are disposed in a spaced apart relationship and constructed to provide a plurality of electrical capacitors. Pressure applied at any point on one plate will cause deflection of that plate toward the other plate changing the capacitance of each capacitor. The change in capacitance generates electrical signals which may be combined and processed to provide signals indicative of the location on the plate at which the pressure was applied and indicative of the magnitude of its vertical component. In an alternate embodiment, first and second spaced apart parallel lines are disposed on one plate with a third ground line interlaced between the first and second lines. A voltage is applied across the first and second lines and the capacitance between the first and second lines is measured as a function of the distance between the plates. An additional alternate embodiment of the sensor utilizing a conductive fluid disposed between the plates is also disclosed.

8 Claims, 11 Drawing Figures

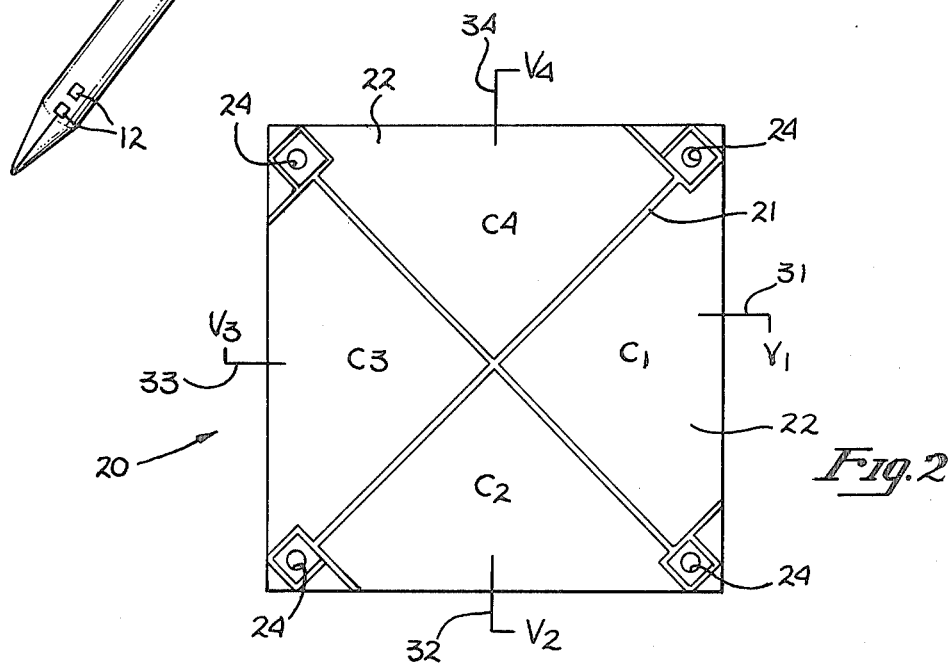
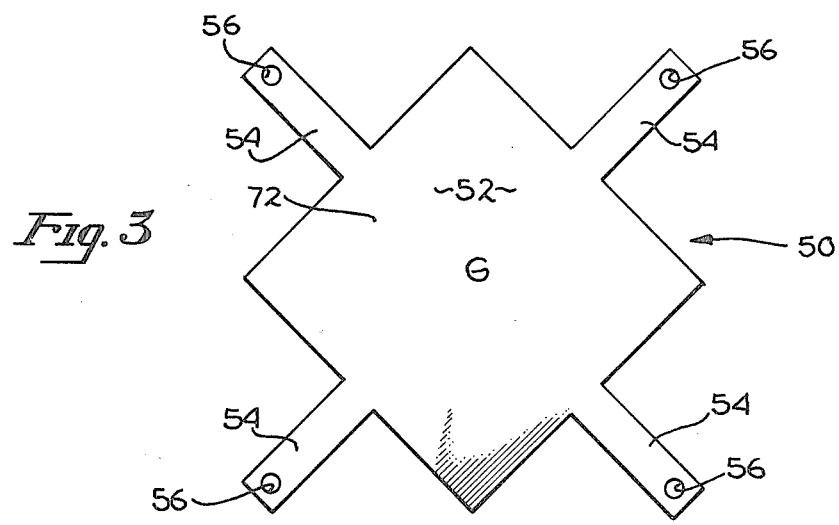
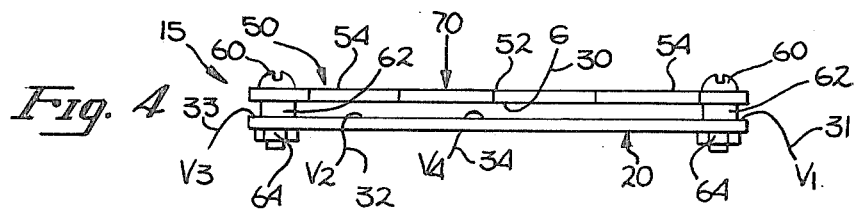

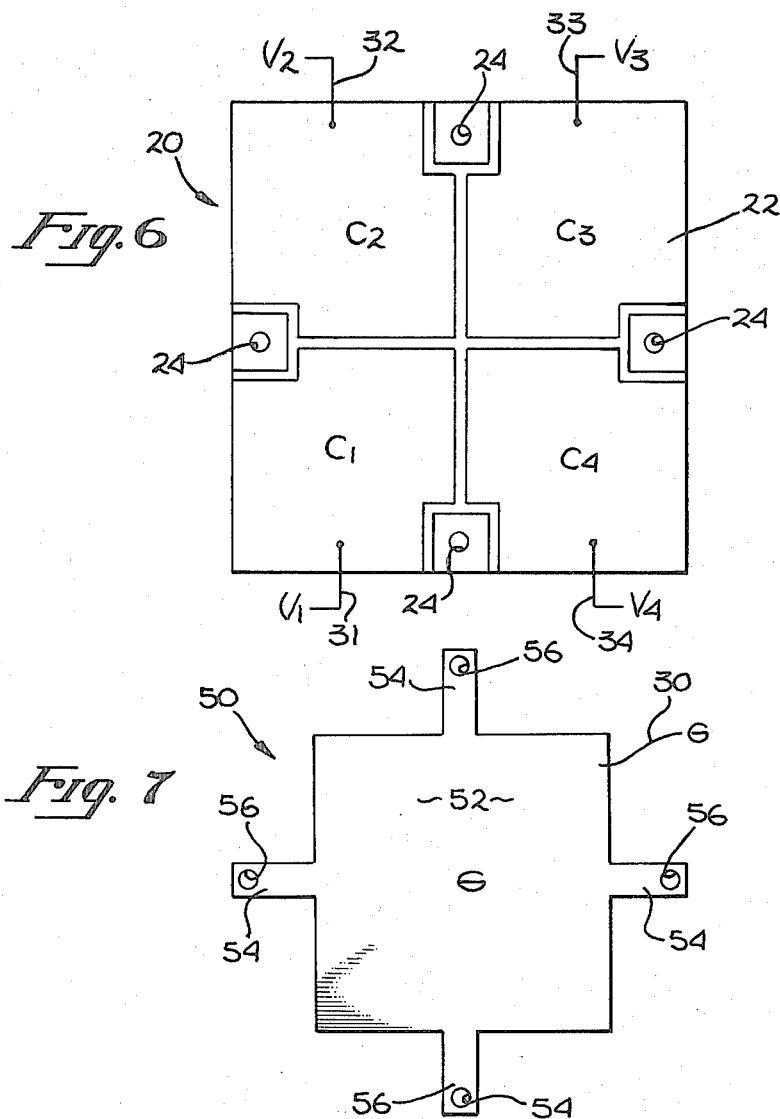
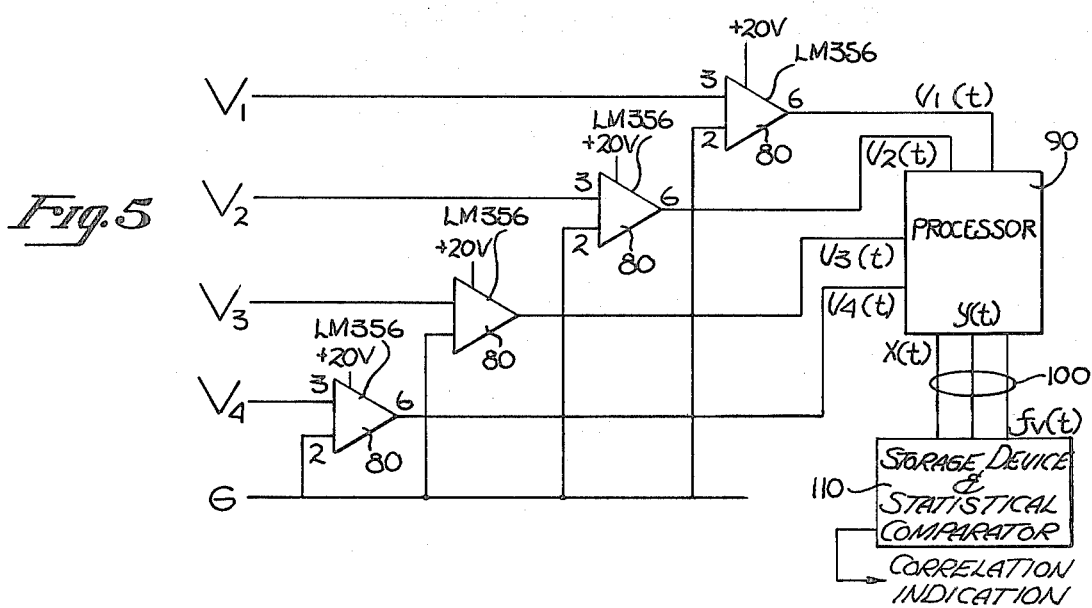

SIGNATURE VERIFICATION SENSOR

PRIOR ART STATEMENT

Applicant is aware of prior art devices used in conjunction with signature vertification which comprise a very expensive penlike device 10 such as shown in FIG. 1 within which are housed a number of sensors 12 which may be accelerometers. The electrical output of the sensors 12 are processed to produce data related to the hand movements during execution of the signature. One device processes the sensor output signals received over line 14 to derive velocity in Cartesian coordinates and total vertical force, another device processes the output to derive acceleration of the pen in Cartesian coordinates. These devices are more specifically described in the following literature, copies of which are enclosed.

| U.S. Pat. No. | Patentee | Issue Date |
| --- | --- | --- |
| 3,699,517 | Dyche | October 17, 1972 |
| 3,668,313 | Dym | June 6, 1972 |
| 3,983,535 | Herbst | September 28, 1976 |

Publications:

*Automated Signature Verification Using Handwriting Pressure,* by Jacob Sternberg of Veripen, Inc. Date: Unknown

*Optimal Accelerometer Layouts for Data Recovery in Signatures Verification,* by John S. Lew of I.B.M. published in IBM Journal of Research and Development, July, 1980.

These items of prior art constitute the most pertinent art of which Applicant is aware, and the pertinence of each is set forth briefly.

Dyche, U.S. Pat. No. 3,699,517.

A device for measuring and computing velocity and acceleration of a pen point and the pen-paper contacts during writing of a signature and comparing derived data with reference data obtained from several prior signatures to determine whether the real time and reference signature were made by the same person. The variations x(t) and y(t) of pen point coordinate with time and pen-paper contact intervals are obtained from a graphic tablet. Differentiator circuit means derive x and y velocity and acceleration components which are converted from analog to digital form for processing in a digital moment computer. Contact interval and end of signature computers receive pen point contact signals and compute the total time duration of the signature as well as the time duration of each of the first five pen-paper contact intervals normalized to the duration of the entire signature. The outputs of the moment, contact interval, and end of signature computers are sixteen components of a real time signature vector. A reference signature vector comprised of the mean values of sixteen similar components is predetermined from a plurality of prior true signatures, the deviation of each of those mean component values from the corresponding component value in a real time signature is compared with a variation limit value for that component to determine a correlation and an authentication decision is made based on a minimum number of such correlations.

Dym, U.S. Pat. No. 3,668,313 teaches a two-dimensional graphic data entry tablet for transforming a positional information into a digital input to a computer system. The tablet structure consists of two continuous resistance lines superimposed on each other. Each of these lines being in the form of a grid and representing position in one of said two dimensions. A voltage differential is applied to each of the grids in order to create a voltage gradient along the path of the grid wires. An analog positional information is created by sensing grid voltage with a capacity coupled stylus. By having the stylus viewing area cover a plurality of wires, the sensed potential averages out and represents a position directly related to the center location of the stylus on the faceplate of the tablet. The resistive grid lines provide the dual function of resistive bleeding and presenting a potential gradient to a capacitively coupled stylus.

Herbst, U.S. Pat. No. 3,983,535 teaches a method and apparatus for verifying a sample signature based on comparison of the dynamics of a reference and a sample signature. More particularly, second derivative values of pen displacements (i.e., acceleration) are periodically sampled for both a reference and sample signature and a comparison of these second derivative values is made. According to the disclosed verification method, the two lists of second derivative values are segmented and similar segments are individually compared and also correlated utilizing shifting of the segments during successive comparisons to find regions of high correlation. A running account of cross correlation values between successive segments of the two signatures are kept. Finally, the maximums of the cross correlation values obtained for each segment comparison are combined and this maximum correlation value is utilized as a verification indicator.

The Sternberg article on the Veripen, Inc. signature verification pen, shows a signature verification process based on the pressure exerted by a person while signing his name. The system consists of a special ballpoint pen with an integral pressure transducer which transforms the pressure on the point into an electrical signal that can be transmitted via cable to a processing device. This device samples the analog signals and converts it to a digital form suitable for transmission to a computer where the analysis takes place. The computer may be a microprocessor, a minicomputer or some portion of a large general purpose computer, depending on the particular security application.

The system operates by first establishing a person's "standard". This standard is a composite of several signatures and is stored for later comparison in memory or on disc storage.

The I.B.M. Journal discusses Optimal accelerometer layouts for a pen or other instrument used to recover data for signature verification. The I.B.M. Journal also provides a list of pertinent references of which Applicant does not have copies, but which may be of interest to the reader.

SUMMARY OF THE INVENTION

A sensor having particular application in the field of signature verification is disclosed. In the presently preferred embodiment, the sensor of the present invention comprises two conductive plates disposed in parallel spaced apart relationship with one another. The first, or bottom plate, is divided into a plurality of electrically isolated areas. The second, or top plate, is a single electrically conductive plate positioned to overlay an equal area of each of the electrically isolated conductive areas of the first plate. Application of pressure (such as by a pen) to any point on the top plate will deflect the top plate and cause a resultant change in one or more electrical parameters existing between the top plate and each of the areas of the bottom plate. The change in the parameter (such as resistance or capacity) may be sensed and converted to an electrical signal for processing. Alternatively, sensors, such as strain gages, may be placed at each corner of the top plate and the reaction forces may be thereby be determined. Appropriate processing of the signals produces data representative of the Cartesian coordinates of the location of application of pressure, as well as representative of the vertical component of the magnitude of the pressure. Means are also provided to adjust the sensitivity of the sensor.

In an alternate embodiment, first and second spaced apart parallel lines are disposed within each electrically isolated area of the bottom plate. A third line is interlaced between the first and second lines and is coupled to a ground potential. A voltage is applied across the first and second lines, and the capacitance between the lines is measured as a function of the distance between the top and bottom plates. The applied vertical force and position of the writing instrument is then determined from the characteristic change in capacitance within each area.

DESCRIPTION OF THE FIGURES

FIG. 1 shows a signature verification pen according to the prior art.

FIG. 2 is a top plan view of one plate of the sensor of the present invention.

FIG. 3 is a top plan view of a second plate of the sensor of the present invention.

FIG. 4 is a side elevational view of the assembled sensor.

FIG. 5 is a functional block diagram of the electronic processing of the sensor output signals.

FIG. 6 is a first alternate configuration of the plate of FIG. 2.

FIG. 7 is a first alternate configuration of the plate of FIG. 3.

DETAILED DESCRIPTION OF THE INVENTION

Figure 8:
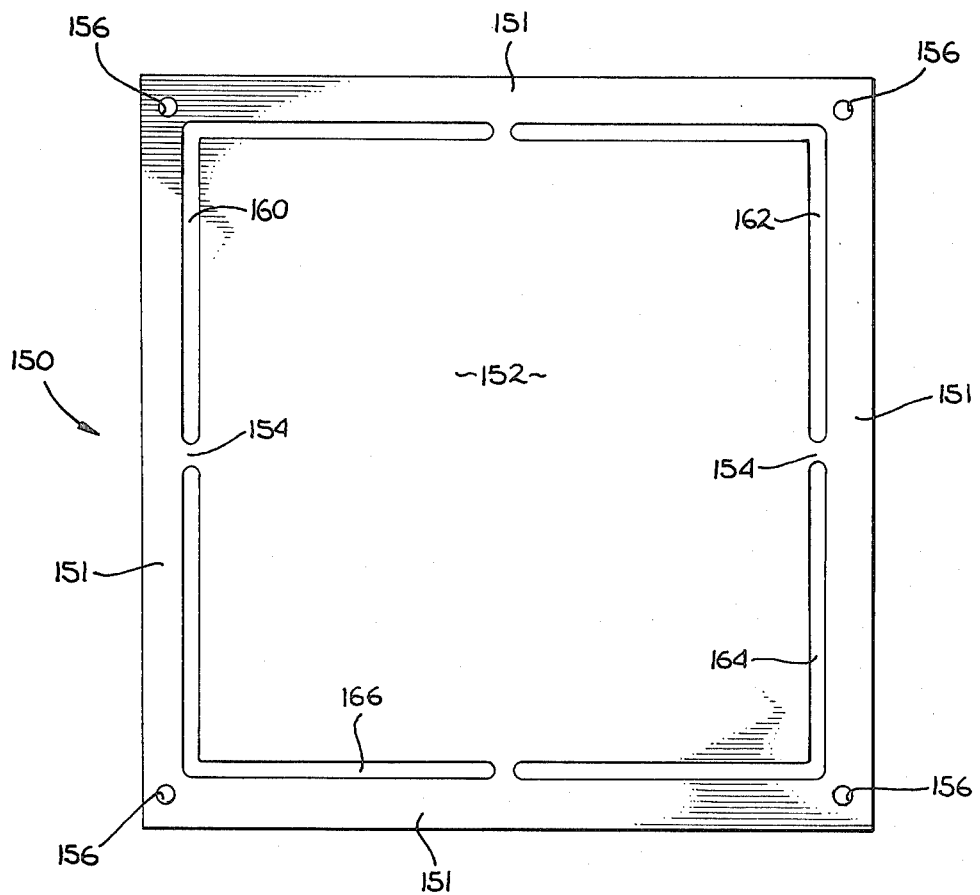
FIG. 8 is a top plan view of a second alternate configuration of the plate of FIG. 3.

A sensor having particular application in the field of signature verification is disclosed. In the following description for purposes of explanation, specific numbers, dimensions and materials etc., are set forth in order to provide a thorough understanding of the present invention. However, it will be apparent to one skilled in the art that the present invention may be practiced without these specific details. In other instances, well known circuits are shown in block diagram form in order not to obscure the present invention unnecessarily.

It is well known in the art of signature verification that each person has a relatively unique and characteristic signature pattern. Every person's signature can be described in terms of the total force applied as a function of the position of the writing instrument at any given time.

My signature verification sensor essentially comprises two plates 20 and 50 secured in parallel spaced apart relationship by bolts 60, spacers 62 and nuts 64 as shown in FIG. 4. If paper or other writing medium is placed on the upper surface of top plate 50, and an individual signs his name thereon, top plate 50 will deform downward toward bottom plate 20. As shown in FIG. 3 and as discussed below, top plate 50 is suspended above bottom plate 20 by four support arms 54.

The application of a vertical force 70 at some point on top plate 50 will result in calculable reaction forces at each of the four support arms 54. By measuring the reaction forces and knowing the dimensions of top plate 50, the magnitude and position of the vertical force 70 may readily be determined. The measurement of the deformation of top plate 50 or of the resulting reaction forces may be realized using a variety of methods. For example, strain gauges or displacement gauges disposed on each arm of top plate 50 would provide the reaction forces at each arm, thereby allowing the forces and position of the writing instrument at any time during the course of the signature to be determined. It will be appreciated that the amount of deflection of the central body portion 52 of plate 50, in response to a vertical force of unit magnitude, is dependent of the physical elasticity and dimensions of the support arms 54. For example, the deflection may be increased by making the support arms 54 longer, thinner, narrower or of a more elastic material. As will be discussed, appropriate processing circuitry may be employed to correlate the force position data obtained in order to verify an individuals signature.

The force applied and the position of the writing instrument at any given time, may be determined electronically from the measurement of changes in electrical parameters between top plate 50 and bottom plate 20 as deformation occurs. In the presently preferred embodiment, top plate 50 and bottom plate 20 are electrically conductive. Bottom plate 20 will typically comprise a layer of substrate material 21 which is preferably insulative in nature, as shown best in FIG. 2. On the top surface of the plate 20 there is provided a thin layer of electrically conductive material 22. This material 22 may be deposited in any of the well known methods presently available, or according to any convenient method that may become known in the future.

The bottom plate 20 is best shown in FIG. 2. The bottom plate 20 will typically comprise a layer of substrate material 21 which is preferably insulative in nature. On the top surface of plate 20 there is provided a thin layer of electrically conductive material 22. This material 22 may be deposited in any of the well known methods presently available, or according to any convenient method that may become known in the future.

The bottom plate 20 has four mounting holes 24 to permit bolts 60 to pass therethrough to secure plate 20 in its assembled configuration. In the presently preferred embodiment, I have divided the electrically conductive layer of material 22 into four areas electrically isolated from one another. As shown in FIG. 2, these four areas may be identified as areas $C_1$, $C_2$, $C_3$ and $C_4$. These areas may be generally triangular in shape and their apexes may be located adjacent to one another at generally the center of plate 20 as shown in FIG. 2. Other geometries may of course be used, and the conductive material 22 may be divided into other than 4 sections. Each bolt 60 has been electrically isolated from the respective areas $C_1$, $C_2$, $C_3$ and $C_4$. Care has been taken to ensure that each of areas $C_1$, $C_2$, $C_3$ and $C_4$ are identical in area and symmetrically disposed. This results in simplification of the algorithm used to process signals originating from the respective areas, as is more fully discussed below.

The top plate 50 comprises a central body portion 52 and for the configuration shown in FIG. 3, four support arms 54 integrally formed with the central body portion 52. The top plate 50 may comprise a substrate material having a thin coating of electrically conductive material thereon, or may simply comprise an electrically conductive plate. The only requirement being that it be capable of making an electrical coupling (e.g., capacitive) with each of the four areas $C_1$, $C_2$, $C_3$ and $C_4$ of the first plate. If the entire top plate 50 is made of electrically conductive material it will be in electrical contact with the bolts 60, which is the reason for electrically isolating each bolt 60 from the areas $C_1$, $C_2$, $C_3$ and $C_4$.

In the assembled configuration as seen in FIG. 4, top plate 50 is held in spaced apart relationship with bottom plate 20 by four spacers 62. Bolts 60 pass through the holes 56 provided in the ends of support arms 54, through the spacers 62 and through holes 24 in bottom plate 20 and are secured therein with nuts 64.

As thus assembled, the two plates 20 and 50 form four variable capacitors. Application of a vertical force such as indicated by arrow 70, to the top of plate 50 will deflect plate 50 toward the areas $C_1$, $C_2$, $C_3$ and $C_4$ and thereby change the capacitance between the top plate 50 and each of areas $C_1$, $C_2$, $C_3$ and $C_4$. Since the device of FIG. 4 is essentially a variable capacitor, on which is maintained a fixed electrical charge, a decrease in the separation of the plates (20 and 50) of the capacitor will produce an increase in the electrical potential between the plates according to the well known relationship:

$$V = (Q/C)$$

where
V = electrical potential (voltage)
Q = electrical charge
C = capacitance (C$\alpha$d: where d is the distance separating the plates.)

Thus as d decreases, C decreases, and for constant Q, V must increase.

If a constant charge is applied between plate 20 and plate 50 of FIG. 4, a potential difference (electrical voltage) will be set up between the plates. For convenience the potential of plate 50 may be used as a reference (ground). The resultant electrical potential on the four areas $C_1$, $C_2$, $C_3$ and $C_4$ may be sensed by means of the wires 31, 32, 33, and 34 as depicted in FIG. 6. Thus, the electrical potential of area $C_1$ may be monitored such as for example by a voltmeter attached to wires 30 and 31. The electrical potential of area $C_2$ may be monitored via wires 30 and 32, and so forth.

Application of a force to the center of upper plate 50 will deflect the upper plate 50 uniformly with respect to each of areas $C_1$, $C_2$, $C_3$ and $C_4$. Application of a force other than at center, such as at point 72 on upper plate 50 (See FIG. 3), will cause plate 50 to be deflected closer to some areas than to other areas. Specifically, for a force applied to point 72, plate 50 would be deflected closer to areas $C_3$ and $C_4$ than to areas $C_2$ and $C_1$. Thus, the voltage present on areas $C_3$ and $C_4$ would increase more than the voltage increase on areas $C_2$ and $C_1$. If the increase in voltage on each of the areas $C_1$, $C_2$, $C_3$ and $C_4$ are identified as $V_1$, $V_2$, $V_3$ and $V_4$ respectively, it is easily verified that, to a first order approximation, the X axis coordinate of the location of application of the force is proportional to $(V_1-V_3)/(V_1+V_3)$ i.e., $X\alpha(V_1-V_3)/(V_1+V_3)$. The Y axis coordinate is proportional to $(V_4-V_2)/(V_4+V_2)$ i.e., $Y\alpha(V_4-V_2)/(V_4+V_2)$.

In addition, the magnitude of the vertical component of the applied force is proportional to the total voltage increase, i.e., $V_1+V_2+V_3+V_4\alpha Fv$.

Because of the non-linearities which are present in the physical device, more accurate formulae to express X, Y and Fv require the presence of additional, i.e., second order, terms. Nonetheless, it is apparent that a formula, of sufficient accuracy, may be devised to combine the sensed voltage changes to derive the Cartesian coordinates of the location of the force.

The change in electrical potential (on each of surfaces $C_1$, $C_2$, $C_3$ and $C_4$) i.e., $V_1$, $V_2$, $V_3$ and $V_4$ respectively, may be applied to the input of a high impedance operational amplifier such as amplifiers 80 which may be part numbers LM 356. As illustrated in FIG. 5, the output of the amplifiers 80 may then be supplied to a processor 90 for appropriate combination to produce electrical signals 100 proportional to the Cartesian coordinates of the force and its vertical force component. These signals 100 may be digitized and provided to a storage and computational device 110 for later comparison with similar data produced as a result of application of a new force. This becomes particularly significant when the applied force is time varying such as that produced by a handwritten signature. The sensor 15 thus has particular utility for signature verification.

For purposes of illustration, suppose a bank desires to be able to verify the authenticity of a depositor's signature. The depositor will first be asked to execute perhaps ten sample signatures on the sensor 15. For each signature the depositor will be applying a force having a vertical component which varies with time, at a location which also varies with time. This will cause the voltages on the capacitors $C_1$, $C_2$, $C_3$ and $C_4$ to vary as described above. These variations will be supplied to the operational amplifiers 80 and the processor 90 to produce a time history of the Cartesian coordinates of the location of the force and a time history of the vertical component of the force (i.e., signals 100) or some other representation of the variations. These analog signals may be sampled at preselected intervals and converted to digital data.

The digital data for each of the ten or so sample signatures may be stored in a device such as a computer 110 for later processing.

At any future date, the authenticity of the signature of a person representing himself as the depositor, may readily be determined. The person is asked to execute a signature on a sensor 15. The resultant digital data produced by the person's signature will be statistically compared (correlated) with the ten sample signatures. If the correlation coefficient is sufficiently high, the signature of the person will be accepted as the genuine signature of the depositor, and the person will be accepted as the same person as the person who executed the sample signature.

It will be apparent, that other geometries may be utilized to configure the top plate 50 and bottom plate 20. One such alternate geometry is shown in FIGS. 6 and 7. For each different geometry, a different algorithm is required for combining the voltage changes $V_1$, $V_2$, $V_3$ and $V_4$ to produce signals 100 proportional to the X and Y coordinates of the location of the force.

For the configuration of FIGS. 6 and 7 it may readily be verified that the vertical component of the force is proportional to $V_1+V_2+V_3+V_4$, i.e., $F_v \alpha V_1+V_2+V_3+V_4$. also the Y coordinate is proportional to $$(V_2+V_3-V_1-V_4)/(V_1+V_2+V_3+V_4)$$

and the X coordinate is proportional to $$(V_3+V_4-V_2-V_1)/(V_1+V_2+V_3+V_4)$$

Again, the above represents a first order approximation. To improve accuracy and account for nonlinearities, additional terms (i.e., second order terms) would have to be added to the algorithms for combining $V_1$, $V_2$, $V_3$ and $V_4$.

If desired, an algorithm could also be devised to normalize all Cartesian cordinates to an arbitrary reference point. For example, the point at which the signature begins could arbitrarily be designated as having coordinates $X=0$, $Y=0$. Alternatively, the left most extension of the signature could be assigned an X coordinate of zero and the lowermost extension of the signature a Y coordinate of zero. Other normalizing techniques and options are readily devised. Similarly, the horizontal and vertical scales could be compressed or expanded so that all signatures of a given person could be compared on the basis of the relative proportions of the signature, i.e., height to width relationships.

A second alternate configuration of the top plate is illustrated in FIG. 8. Top plate 150 comprises an outer frame portion 151 connected to plate 152 by arms 154. The plate 152 and arms 154 are formed in the plate 150 by cutting out the four slots 160, 162, 164 and 166. The top plate 150 is particularly economical to manufacture. Comparing the configurations of FIGS. 3 and 8, and assuming that for each configuration it is desired to produce a sensor plate (i.e., plate 52 of FIG. 3 or plate 152 of FIG. 8) having the same area, then the configuration of FIG. 8 will require less material than will the configuration of FIG. 3.

Figure 9:
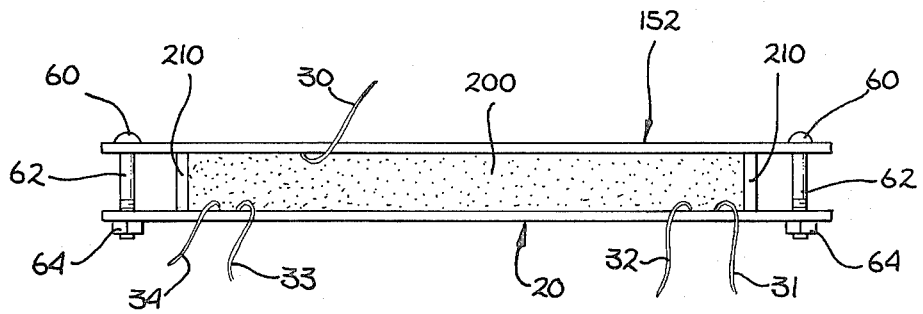
FIG. 9 is a cross sectional view of a third alternate embodiment of the invention utilizing the conductivity of a conductive fluid between the plates.

Referring to FIG. 9, the third alternate embodiment of the present invention which measures changes in electrical conductivity is disclosed. A conductive fluid 200 is disposed between plates 20 and 152, and a constant voltage is applied across the plates. When the thickness of a conductive fluid is altered, there is a corresponding change in the fluids conductivity. Upon the application of pressure to plate 152, the plate will deform thereby changing the thickness of fluid 200 and altering its conductivity. The change in the fluid conductivity in turn produces a corresponding variation in the current passing through the fluid. The change in current (through wires 31, 32, 33 and 34 referenced to ground wire 30) may be sensed and processed in much the same way as the changes in voltage for the prior embodiment, to derive the location and magnitude of the applied force.

The conductive fluid 200 would be sealingly retained between plate 152 and plate 20 by a gasket 210 suitably sealed to the plates 20 and 152. The wires 31, 32, 33 and 34 used to sense the current changes would, of course, pass through the gasket 210 at any convenient location and be sealed to the gasket 210 to prevent leakage of conductive fluid 200.

Figure 10:
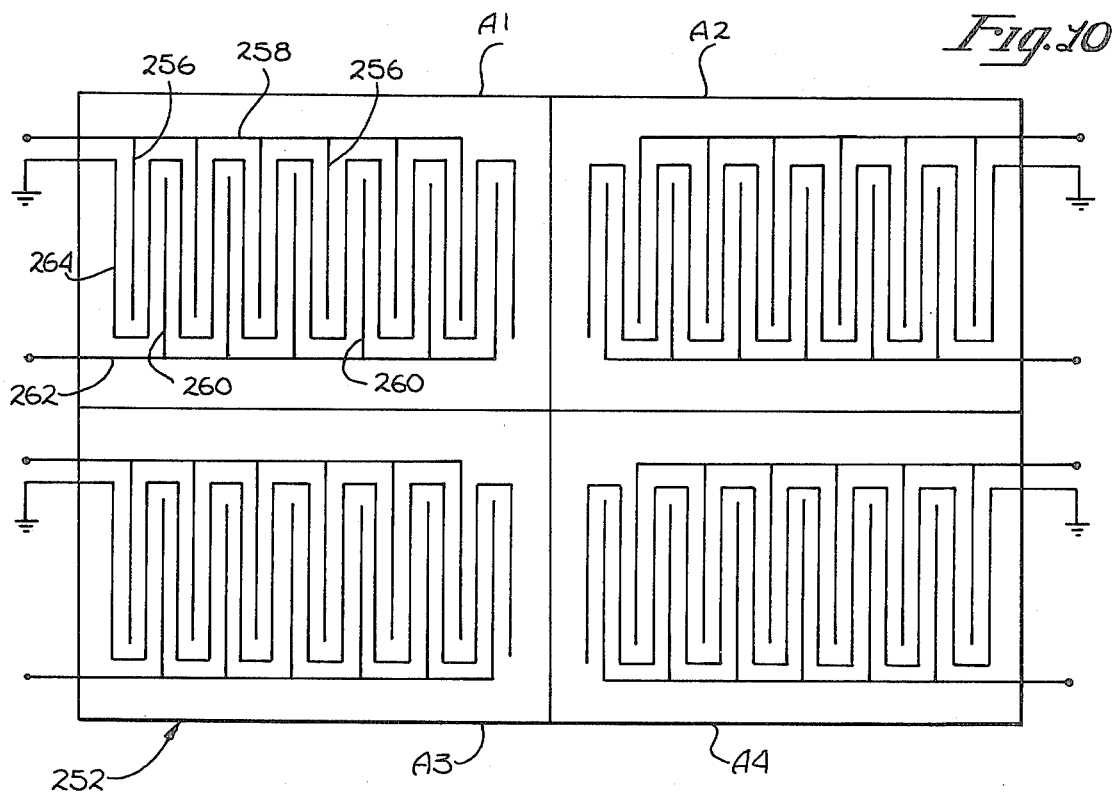
FIG. 10 is a top plan view of a bottom plate of a fourth alternate embodiment of the present invention utilizing first and second conductive lines of alternate polarity.

A fourth alternate embodiment of the present invention is illustrated in FIG. 10. The structural configuration of the invention is similar to that as shown in FIG. 4 and includes generally rectangular upper plate 250 and a bottom plate 252 maintained in a parallel spaced apart relationship by bolts 60, spacers 62 and nuts 64. Top plate 250 is comprised of a conductive material, such as for example aluminum, or stainless steel. The top plate 250 is coupled to a ground potential, and as will be discussed forms a part of a three pole variable capacitor. Bottom plate 252 is divided into four electrically isolated areas as shown best shown in FIG. 10. These areas are generally rectangular in shape and may be identified as A1, A2, A3 and A4. It will be apparent that other geometries may of course be used in accordance with the particular application of the present invention.

Referring once again to FIG. 10, within each electrically isolated area parallel conductive lines 256 are spaced apart and coupled to a common line 258 on one side of the bottom plate. Similarly, parallel spaced apart lines 260 are disposed between lines 256 and are coupled to a second common line 262 which lies essentially parallel to the common line 258. As illustrated, a third ground line 264 is interlaced between lines 256 and lines 260, and is coupled to a ground potential. A voltage is applied across conducting lines 256 and 260 within each electrically isolated area, and the corresponding capacitance between the alternating lines 256 and 260 is determined as a function of the distance between the top and bottom plates. Placement of the conductive lines on the bottom plate 252 may be accomplished using a variety of commonly known techniques in the art, including circuit board etching methods. It will be apparent to one skilled in the art that lines 256 and 260 form essentially a multiplicity of capacitors coupled in parallel and that the use of multiple parellel wires thereby increases the total capacitance of the system. In addition, the spacing between lines 256, 260 and the interlaced ground line 264 may be varied, as well the length of lines 256 and 260 in order to achieve the desired function of capacitance versus plate distance.

Figure 11:
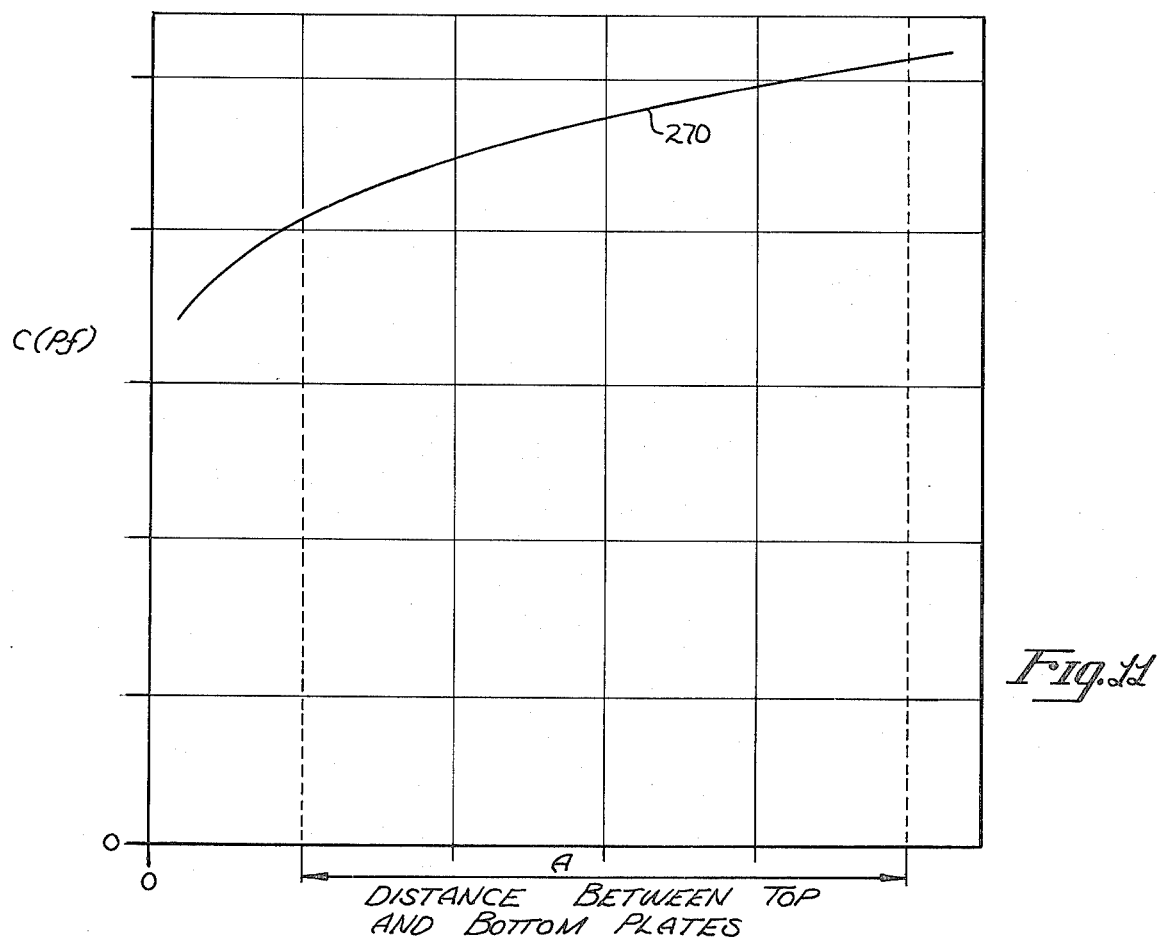
FIG. 11 is a graph illustrating the variation of capacitance between the first and second conducting lines as a function of the distance between the top and bottom plates of the fourth alternate embodiment of FIG. 10.

Referring now to FIG. 11, the curve 270 illustrates the capacitance between lines 256 and 260 versus the separation of the top and bottom plates. Capacitance (C) is measured in pico farads on the ordinate, and the plate separation is represented on the abscissa. Although it is theoretically possible to describe curve 270 mathematically based on the physical layout of the conductive lines on bottom plate 252, the derivation is complex and as a practical matter an empirical solution is preferred. It has been found in practice that a for line spacing between lines 256, 260 and ground line 264 of approximately 0.05 inches and a conductive strip width approximately 0.01 inches, that a fairly wide and relatively linear response region "A" is obtained. As illustrated, the capacitance between lines 256 and 260 decreases in an essentially linear fashion within region "A" as the distance between the plates is decreased. Therefore, the initial separation of the plates would be set within region "A" such that the vertical deformation of top plate 250 toward the bottom plate 252 will result in a corresponding linear decrease of measureable capacitance.

Thus, the application of a vertical force to top plate 250 will change the capacitance between lines 256 and 260 in relation to the relative deformation of the top plate with respect to each area $A_1$, $A_2$, $A_3$ and $A_4$. As described above with respect to the embodiment of FIG. 4, appropriate signal processing is utilized such as processor 90 and statistical comparitor 110 to compare an individual signature with previously stored digitalized exemplars.

While the sensor has been particularly described with reference to FIGS. 2 through 11 and with emphasis on signature verification, it should be understood that the figures are for illustration only and should not be taken as limitations upon the invention. In addition, it is clear that the sensor of the present invention has utility far exceeding merely signature verification. By way of illustration the present invention may be utilized for data entry, as a touch control panel in a security system, or as a means for cursor control on a cathode ray tube. Furthermore, it should also be apparent that the signature verification aspects of the invention could be adapted to provide only limited access to a controlled security area. For example, no person would be allowed to enter an area (i.e., the door would not be electronically unlocked) unless the signature of the person seeking entrance matched one of the signatures stored in the control device.

It is contemplated that many changes and modifications may be made, by one of ordinary skill in the art, to the materials and arrangements of elements of the invention without departing from the spirit and scope of the invention.

What is claimed is:

1. A device for producing output signals indicative of the magnitude and location of application of an applied force, comprising:
   a first electrically conductive surface;
   a second surface including a plurality of electrically conductive areas defined thereon;
   said first electrically conductive surface being disposed in a spaced apart capacitive relationship with said second surface having said plurality of electrically conductive areas;
   generating means for generating a corresponding plurality of electrical signals representative of the capacitance between said first electrically conductive surface and each of said plurlity of second electrically conductive areas;
   application of said force causing deflection of said first electrically conductive surface producing a change in each of said corresponding plurality of electrical signals, the magnitude and ratio of said changes being associated with a unique location of application of said force on said first electrically conductive surface;
   means for adjusting the magnitude of change of said corresponding plurality of electrical signals in response to a vertical force of unit magnitude located at a reference location on said first electrically conducting surface.

2. The device according to claim 1, wherein the location of application of said force and the magnitude of the vertical component of said force vary with time and further comprising:
   processing means for combining said corresponding plurality of electrical signals according to a predetermined algorithm toproduce a set of electrical signals proportional to the Cartesian coordinates of the location of said force and proportional to the magnitude of the vertical force component of said force as said location and magnitude vary with time;
   storage means coupled to said processing means for storing data representative of said set of electrical signals.

3. The device according to claim 2, wherein said means for adjusting comprises a plurality of support arms integrally formed with said first electrically conductive surface and connecting said first electrically conductive surface to a corresponding plurality of supports whereby said first electrically conductive surface is supported in a spaced apart capacitive relationship with said plurality of second electrically conductive areas.

4. The device according to claim 3 wherein the magnitude of change may be adjusted by variation of the length and width of said support arms.

5. The device according to claim 1 further comprising a conductive fluid sealingly disposed between said first electrically conductive area and said plurality of second electrically conductive areas.

6. A device for producing output signals indicative of the magnitude and location of application of an applied force, comprising:
   a first electrically conductive surface;
   a second surface including a plurality of electrically isolated areas;
   said first electrically conductive surface being disposed in spaced apart relationship with said second surface;
   first and second conductive lines disposed within each of said isolated areas;
   generating means for generating a corresponding plurality of electrical signals representative of the capacitance between said first and second conductive lines within each isolated area as a function of the distance separating said first and second surfaces;
   a third conductive line disposed between said first and second conductive lines and coupled to a grounf potential;
   application of said force causing deflection of said first electrically conductive surface producing a change in each of said corresponding plurality of electrical signals, the magnitude and ratio of said changes being associated with a unique location of applicaiton of said force on said first electrically conductive surface.

7. The device of claim 6, wherein said first conductive surface is coupled to a ground potential.

8. The device of claim 7, wherein the magnitude of said capacitance may be adjusted by variation of the length, width and spacing between said first and second conductive lines.

* * * * *